United States Patent
Petty (10) Patent No.: US 11,009,060 B2
(45) Date of Patent: May 18, 2021

(54) FASTENER ASSEMBLY HAVING A LEAK RESISTANT THREADED INSERT

(71) Applicant: UNITED TECHNOLOGIES CORPORATION, Farmington, CT (US)

(72) Inventor: Dale W. Petty, Wallingford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 339 days.

(21) Appl. No.: 15/909,037

(22) Filed: Mar. 1, 2018

(65) Prior Publication Data
US 2019/0271352 A1 Sep. 5, 2019

(51) Int. Cl.
| | |
|---|---|
| F16B 43/00 | (2006.01) |
| F23R 3/60 | (2006.01) |
| F01D 25/24 | (2006.01) |
| F01D 11/00 | (2006.01) |
| F01D 25/28 | (2006.01) |
| F04D 29/60 | (2006.01) |

(52) U.S. Cl.
CPC .......... F16B 43/001 (2013.01); F01D 11/005 (2013.01); F01D 25/243 (2013.01); F23R 3/60 (2013.01); F01D 25/28 (2013.01); F04D 29/601 (2013.01); *F05D 2220/323* (2013.01); *F05D 2240/14* (2013.01); *F05D 2240/55* (2013.01); *F05D 2260/31* (2013.01); *F05D 2260/37* (2013.01); *F23R 2900/00017* (2013.01)

(58) Field of Classification Search
USPC .................................................. 411/179, 180
See application file for complete search history.

(56) References Cited

U.S. PATENT DOCUMENTS 2,188,422 A * 1/1940 Waner ................... F16B 37/067
411/34
3,534,797 A * 10/1970 Haug .................... F16B 21/086
411/108

(Continued)

FOREIGN PATENT DOCUMENTS

| EP | 1464853 | 10/2004 |
| EP | 1793097 | 6/2007 |

(Continued)

OTHER PUBLICATIONS

European Patent Office, European Search Report dated Jun. 12, 2019 in Application No. 19160138.4.

(Continued)

*Primary Examiner* — David Hamaoui
*Assistant Examiner* — Jason Fountain
(74) *Attorney, Agent, or Firm* — Snell & Wilmer L.L.P.

(57) ABSTRACT

A fastener assembly may be configured to mount structures in a gas turbine engine. The fastener assembly may comprise a fastener and a leak resistant insert. The leak resistant insert may be configured to at least partially reduce fluid leakage between the coupling of the fastener and the leak resistant insert. The leak resistant insert may comprise an outer surface opposite an inner threaded surface. The inner threaded surface may define an insert opening through leak resistant fastener insert, configured to receive the fastener. The outer surface may define an insert end enclosing the inner threaded surface opposite the insert opening.

20 Claims, 7 Drawing Sheets

(56) References Cited

U.S. PATENT DOCUMENTS

| | | | |
|---|---|---|---|
| 4,905,931 A | 3/1990 | Covey | |
| 6,315,510 B1* | 11/2001 | Sturies | F16B 13/00 |
| | | | 411/182 |
| 6,415,610 B1 | 7/2002 | Parker | |
| 6,726,422 B2* | 4/2004 | Giannakakos | C22C 14/00 |
| | | | 411/178 |
| 6,895,761 B2* | 5/2005 | Mitchell | F23R 3/007 |
| | | | 60/752 |
| 8,057,144 B2* | 11/2011 | Johnson | F16B 19/1072 |
| | | | 411/34 |
| 8,636,465 B2* | 1/2014 | Durocher | F01D 25/243 |
| | | | 415/136 |
| 9,027,216 B2 | 5/2015 | Beeles et al. | |
| 10,260,546 B2* | 4/2019 | Goldberg | B60R 19/50 |
| 2004/0118127 A1* | 6/2004 | Mitchell | F23R 3/007 |
| | | | 60/796 |
| 2006/0174631 A1 | 8/2006 | Parker | |
| 2011/0081234 A1* | 4/2011 | Durocher | F01D 25/243 |
| | | | 415/134 |

FOREIGN PATENT DOCUMENTS

| | | | | |
|---|---|---|---|---|
| GB | 647302 | 12/1950 | | |
| GB | 647302 A | * 12/1950 | | F23R 3/007 |

OTHER PUBLICATIONS

European Patent Office, European Office Action dated Oct. 30, 2020 in Application No. 19160138.4.

* cited by examiner

FASTENER ASSEMBLY HAVING A LEAK RESISTANT THREADED INSERT

FIELD

The present disclosure relates generally to gas turbine engines, and more specifically, to a fastener assembly having a leak resistant threaded insert for use in mounting components in gas turbine engines.

BACKGROUND

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

SUMMARY

In various embodiments, a leak resistant threaded insert is disclosed. The leak resistant threaded insert may comprise an outer surface opposite an inner threaded surface. The inner threaded surface may define an insert opening configured to receive a fastener. The outer surface may define an insert end enclosing the inner threaded surface opposite the insert opening.

In various embodiments, the leak resistant fastener insert may also comprise a flange defining a radial protrusion from the outer surface. The insert end may comprise a conical shape, an elliptical shape, a parabolic shape, a stepped shape, a concave shape, a hemispherical shape, or a square shape. The leak resistant fastener insert may comprise a nickel-chromium alloy material, a titanium alloy material, a cobalt alloy material, or a corrosion resistant steel material. The leak resistant fastener insert may be monolithic.

In various embodiments, a fastener assembly is disclosed. The fastener assembly may comprise a leak resistant insert and a fastener. The leak resistant threaded insert may comprise an outer surface opposite an inner threaded surface. The inner threaded surface may define an insert opening. The outer surface may define an insert end enclosing the inner threaded surface opposite the insert opening. The fastener may be inserted within the insert opening and coupled to the inner threaded surface of the leak resistant insert.

In various embodiments, the fastener may comprise a threaded body configured to engage the inner threaded surface of the leak resistant insert in response to the fastener being coupled to the leak resistant insert. The leak resistant insert may comprise a flange defining a radial protrusion from the outer surface. The insert end of the leak resistant insert may comprise a conical shape, an elliptical shape, a parabolic shape, a stepped shape, a concave shape, a hemispherical shape, or a square shape. The leak resistant insert may comprise a nickel-chromium alloy material, a titanium alloy material, a cobalt alloy material, or a corrosion resistant steel material. The leak resistant insert may be monolithic.

In various embodiments, a gas turbine engine is disclosed. The gas turbine engine may comprise a compressor section, a combustor section, and a turbine section. At least one of the compressor section, the combustor section, or the turbine section may include a fastener assembly for mounting structures. The fastener assembly may comprise a leak resistant insert and a fastener. The leak resistant threaded insert may comprise an outer surface opposite an inner threaded surface. The inner threaded surface may define an insert opening. The outer surface may define an insert end enclosing the inner threaded surface opposite the insert opening. The fastener may be inserted within the insert opening and coupled to the inner threaded surface of the leak resistant insert.

In various embodiments, the fastener assembly may be installed within at least one of the compressor section, the combustor section, or the turbine section using at least one of a press fit installation process or a shrink fit installation process. The fastener may comprise a threaded body configured to engage the inner threaded surface of the leak resistant insert in response to the fastener being coupled to the leak resistant insert. The leak resistant insert may comprise a flange defining a radial protrusion from the outer surface. The insert end of the leak resistant insert may comprise a conical shape, an elliptical shape, a parabolic shape, a stepped shape, a concave shape, a hemispherical shape, or a square shape. The insert end of the leak resistant insert may comprise a square shape. The leak resistant insert may be monolithic.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
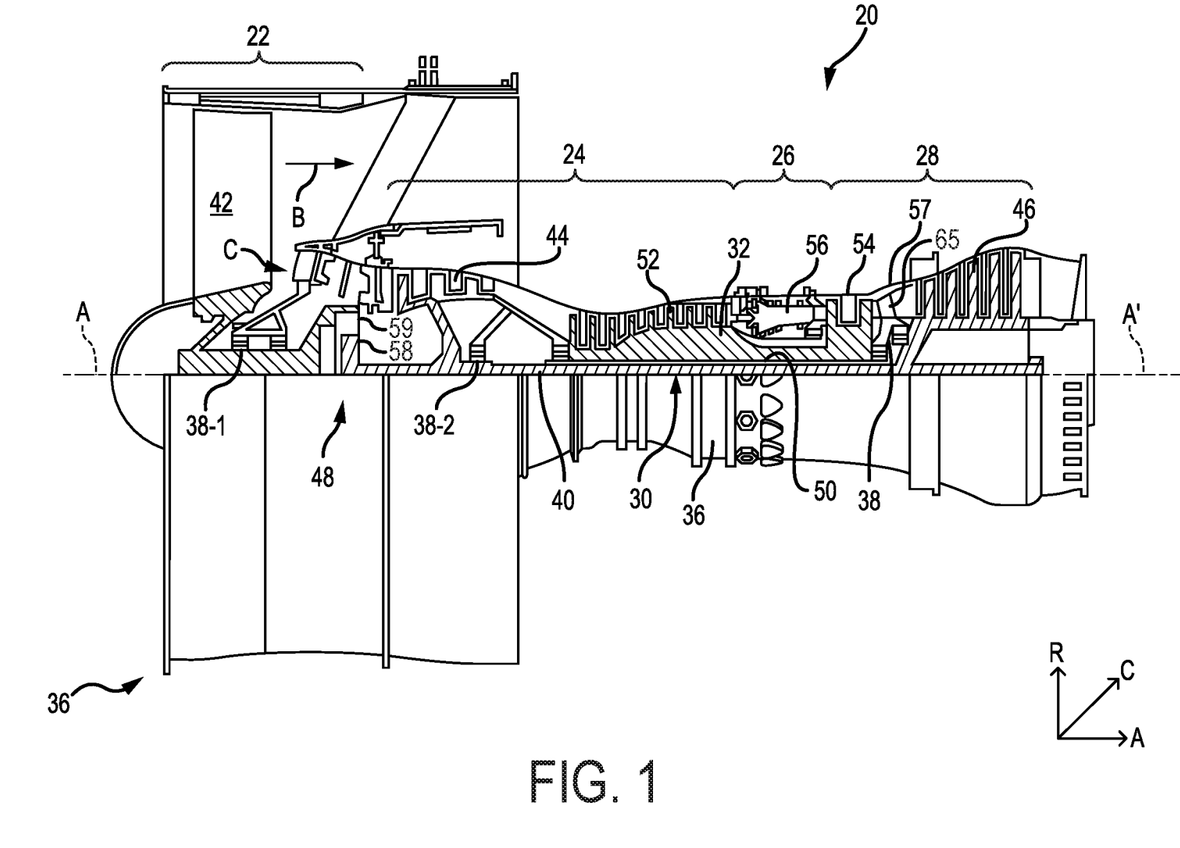
FIG. 1 illustrates a schematic cross-section of an exemplary gas turbine engine, in accordance with various embodiments.

In various embodiments, and with reference to FIG. 1, a gas turbine engine 20 is disclosed. As used herein, "aft" refers to the direction associated with a tail (e.g., the back end) of an aircraft, or generally, to the direction of exhaust of gas turbine engine 20. As used herein, "forward" refers to the direction associated with a nose (e.g., the front end) of the aircraft, or generally, to the direction of flight or motion. An A-R-C axis has been included in FIGS. 1 and 2 to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive coolant (e.g., air) along a bypass flow-path B, while compressor section 24 may further drive coolant along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 58 enclosed within a gear housing 59. Gear assembly 58 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the coolant along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 65 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. Although a gas turbine engine is used for exemplary purposes, the fastener assembly of the present disclosure may be used in various embodiments in any suitable device or apparatus having a fastener coupled to an insert.

Figure 2:
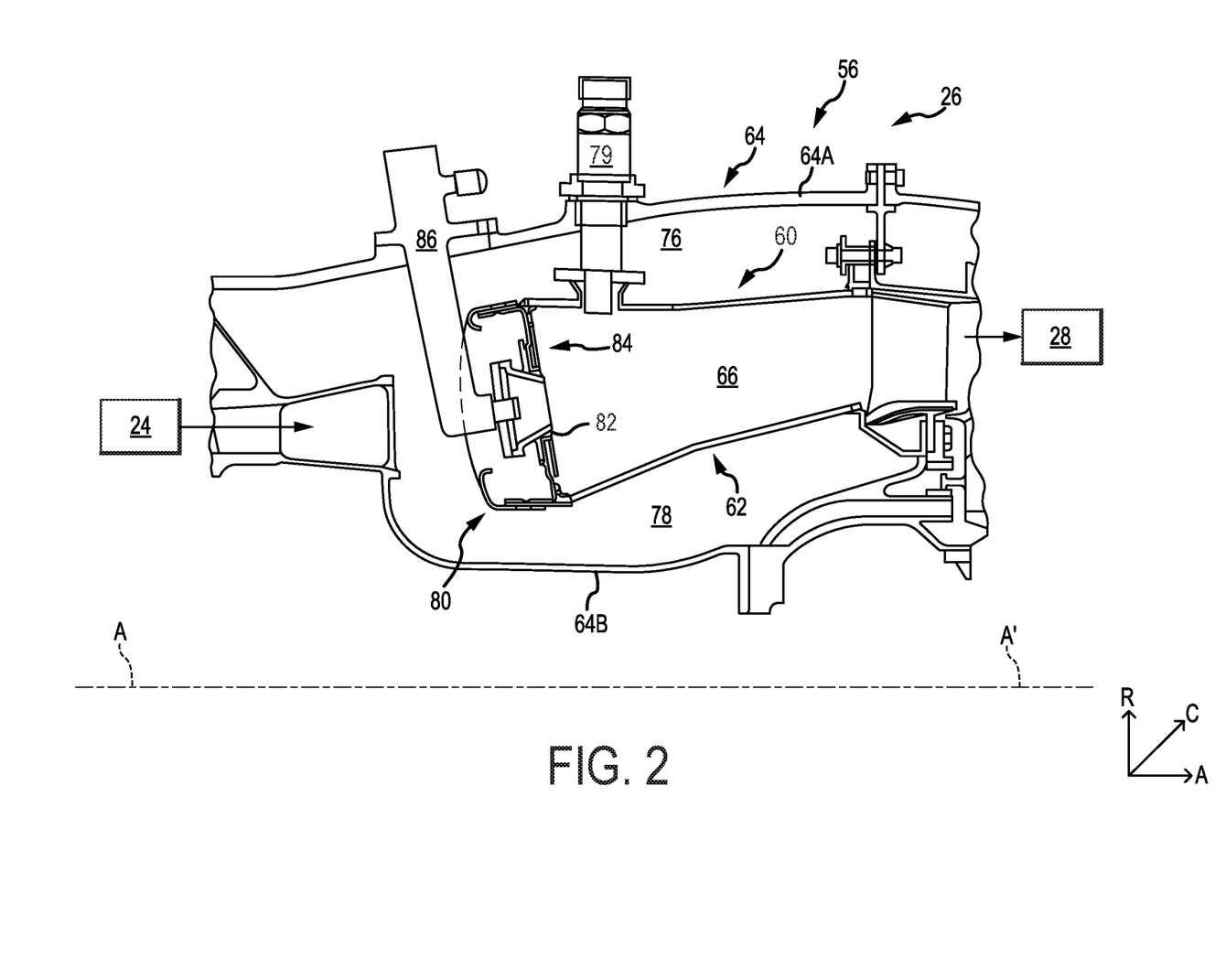
FIG. 2 illustrates a schematic cross-section of a combustor section of a gas turbine engine, in accordance with various embodiments.

With reference now to FIG. 2 and continued reference to FIG. 1, combustor section 26 generally includes combustor 56 with an outer combustor wall assembly 60, an inner combustor wall assembly 62, and a diffuser case module 64 that encases combustor wall assemblies 60, 62. Outer combustor wall assembly 60 and inner combustor wall assembly 62 are radially spaced apart such that an annular combustion chamber 66 is defined therebetween. Combustion chamber 66 may receive compressed air from compressor section 24 and may contain the combustion products that flow axially toward turbine section 28. Outer combustor wall assembly 60 is spaced radially inward from an outer diffuser case 64A of diffuser case module 64 to define an outer annular plenum 76. Inner combustor wall assembly 62 is spaced radially outward from an inner diffuser case 64B of diffuser case module 64 to define an inner annular plenum 78.

Combustor section 26, including diffuser case module 64, may be a landing point to one or more brackets, panels, shells, assemblies, fuel nozzles, igniters, and/or other structures or components. For example, each combustor wall assembly 60, 62 generally includes a respective support shell that supports one or more liners mounted thereto and arranged to form a liner array. At least one igniter 79 may generally be coupled to and project through outer diffuser case 64A and combustor wall assembly 60 to initially ignite a blended fuel-air mixture. Combustor 56 further includes a forward assembly 80 downstream (e.g., aft) of compressor section 24 to receive compressed airflow therefrom. Forward assembly 80 introduces core combustion air into the forward section of combustion chamber 66 while the remainder enters outer annular plenum 76 and inner annular plenum 78. Forward assembly 80 may generally include a bulkhead assembly 84, and one or more swirler assemblies 82 that are circumferentially spaced from one-another. Bulkhead assembly 84 includes a bulkhead support shell secured to combustor wall assemblies 60, 62, and a liner that may have a plurality of circumferentially distributed bulkhead heat shields or panels secured to bulkhead support shell around each of a respective swirler assembly 82 opening. Each swirler assembly 82 is circumferentially aligned with one of a plurality of fuel nozzles 86 and a respective hood ports. The fuel nozzles 86, swirler assemblies 82, and adjacent structures generate the blended fuel-air mixture that supports stable combustion in combustion chamber 66.

Each of the brackets, panels, shells, assemblies, fuel nozzles, igniters, and/or other structures or components may be coupled to combustor wall assembly 60, 62, and diffuser case module 64, including diffuser case 64A, 64B, using a fastener assembly. For example, in various embodiments and with reference to FIG. 3, a fastener assembly 300 may be used to couple the various structures or components to combustor wall assembly 60, 62, and diffuser case module 64, including diffuser case 64A, 64B.

Figure 3:
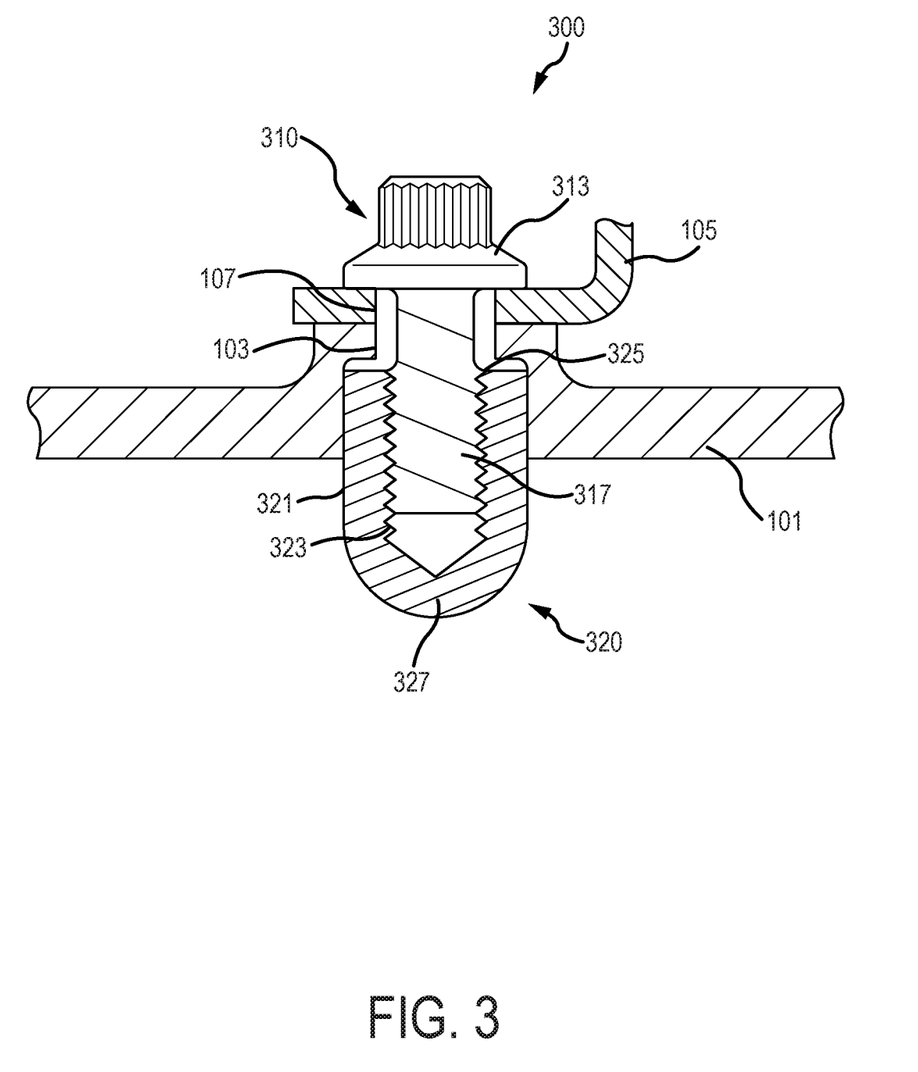
FIG. 3 illustrates a cross-sectional view of a fastener assembly, in accordance with various embodiments.

In various embodiments, fastener assembly 300 may be configured to couple a mounting plate 105 (e.g., a bracket, panel, shell, assembly, fuel nozzle, igniter, etc., as discussed herein) to a case wall 101 (e.g., a surface of combustor wall assembly 60, 62; diffuser case 64A, 64B; a turbine case; a compressor case; etc.). Fastener assembly 300 may be configured to fluidly seal the coupling between mounting plate 105 and case wall 101 to at least partially reduce fluid leakage. For example, fluid (e.g., air, gas, etc.) may pass between head 313 of fastener 310 and mounting plate 105, into mounting plate hole 107 and case wall hole 103, and between the threading of threaded body 317 and inner threaded surface 323 (e.g., through a leak path). Insert end 327 of leak resistant insert 320 may enclose the threading of threaded body 317 and inner threaded surface 323 to fluidly seal the leak path through fastener assembly 300. In various embodiments, at least partially reducing the leakage of fluid (e.g., hot gases) through fastener assembly 300 may further improve gas turbine engine efficiency and fuel economy.

In various embodiments, fastener assembly 300 may comprise a fastener 310 and a leak resistant insert 320. Fastener 310 may be configured to insert through mounting plate hole 107 and case wall hole 103, and into leak resistant insert 320. Fastener 310 may comprise any suitable type of fastener, bolt, or the like, and may be sized and shaped to fit through mounting plate hole 107 and case wall hole 103, and into leak resistant insert 320. Fastener 310 may comprise a head 313 coupled to a threaded body 317. Head 313 may comprise any type of fastener head, such as, for example, a round head, a hex cap, a pan head, a flat head, a truss head, a fillister head, and/or any other suitable type of fastener head. Threaded body 317 may comprise a threaded outer surface (e.g., a spiral-grooved configuration, and/or any other suitable threaded configuration) configured to engage inner threaded surface 323 of leak resistant insert 320 to couple fastener 310 to leak resistant insert 320. In that respect, fastener 310 may be configured to insert through mounting plate hole 107 and case wall hole 103, and into leak resistant insert 320 to couple case wall 101 to mounting plate 105.

In various embodiments, leak resistant insert 320 (e.g., a leak resistant fastener insert) may be configured to at least partially fluidly seal the coupling of mounting plate 105 to case wall 101. Leak resistant insert 320 may comprise any suitable shape and size. Leak resistant insert 320 may be monolithic (e.g., a single solid structure). Leak resistant insert 320 may be sized and shaped to be inserted into case wall hole 103. In response to leak resistant insert 320 being inserted into case wall hole 103, an outer surface 321 of leak resistant insert 320 may contact the surface of case wall hole 103 to fluidly seal the coupling. Leak resistant insert 320 may comprise any material, such as, for example, a nickel alloy, a nickel-chromium alloy (such as that sold under the mark INCONEL, e.g., INCONEL 600, 617, 618, 625, 718, X-70, etc.), a titanium alloy, a cobalt alloy, a corrosion resistant steel, and/or any other suitable material having properties resistant to oxidation and corrosion in a variety of environments and temperature ranges. Leak resistant insert 320 may be formed using any suitable process, such as, for example, by machining, investment casting, additive manufacturing (e.g., fused deposition modeling, polyjet 3D printing, direct metal laser sintering, etc.), or the like. Additive manufacturing techniques may enable the formation of complex contours on leak resistant insert 320, such as, for example, the grooves on inner threaded surface 323.

Leak resistant insert 320 may comprise an insert opening 325 opposite an insert end 327. Leak resistant insert 320 may also comprise outer surface 321 opposite an inner threaded surface 323. Inner threaded surface 323 may define insert opening 325 through leak resistant insert 325 (e.g., insert opening 325 and inner threaded surface 323 may define a void through leak resistant insert 320). In that respect, insert opening 325 and inner threaded surface 323 may be sized and shaped to receive fastener 310. Inner threaded surface 323 may comprise a threaded surface (e.g., a spiral-grooved configuration, and/or any other suitable threaded configuration) configured to engage threaded body 317 of fastener 310 in response to fastener 310 being inserted into leak resistant insert 320. Outer surface 321 may be configured to contact the surface of case wall hole 103 in response to leak resistant insert 320 being installed within case wall hole 103.

Figure 4:
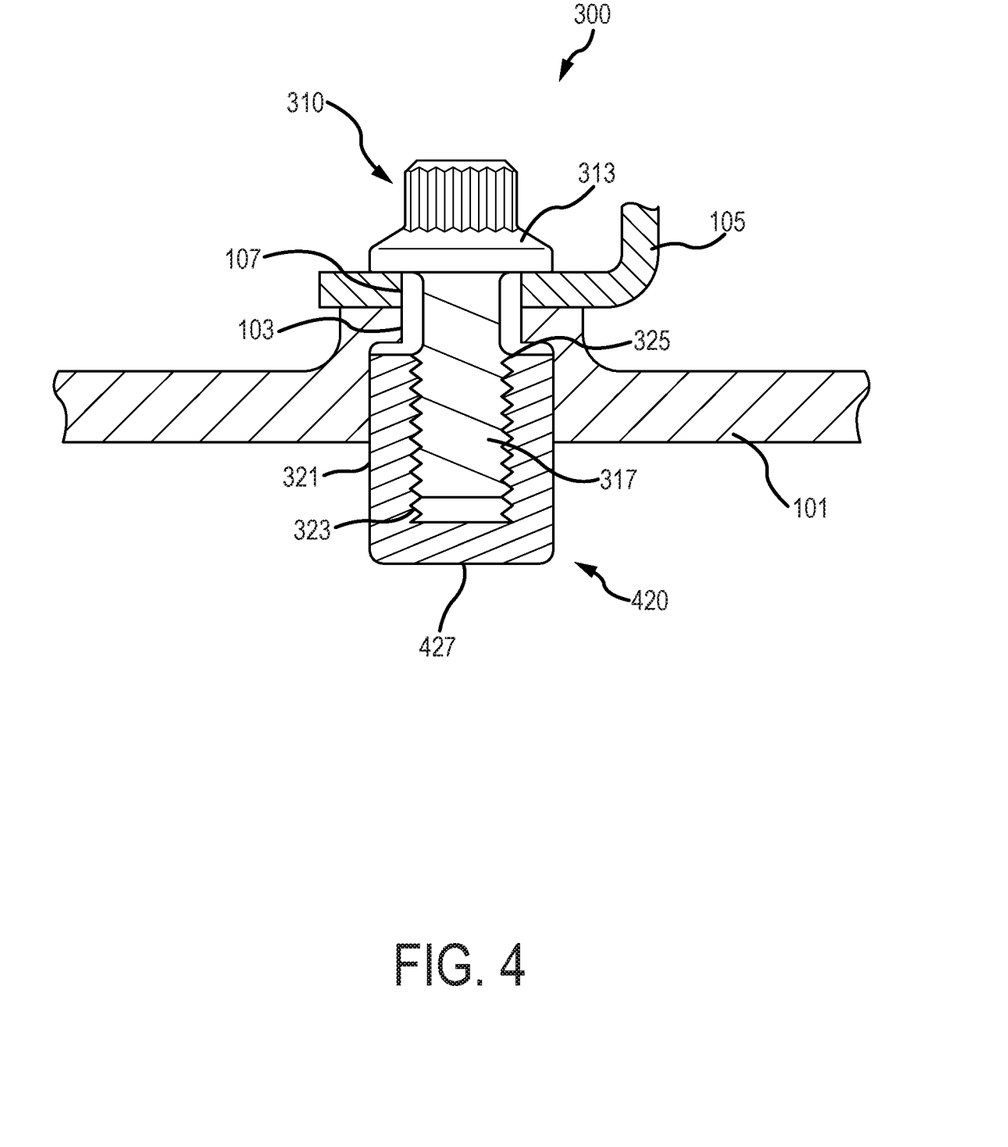
FIG. 4 illustrates a cross-sectional view of a fastener assembly comprising a leak resistant insert having a square shaped end, in accordance with various embodiments.

Outer surface 321 may define insert end 327 to enclose inner threaded surface 323 opposite insert opening 325. Insert end 327 may be configured to fluidly seal fastener assembly 300 in response to fastener 310 engaging leak resistant insert 320. Insert end 327 may comprise any suitable shape capable of fluidly sealing the coupling of threaded body 317 and inner threaded surface 323. For example, insert end 327 may comprise a conical shape, an elliptical shape, a parabolic shape, a stepped shape, a concave shape, a hemispherical shape, or the like. In various embodiments, and with reference to FIG. 4, a leak resistant insert 420 may also comprise an insert end 427 having a square shape. Leak resistant insert 420 may be similar to leak resistant insert 320, with brief reference to FIG. 3.

Figure 5:
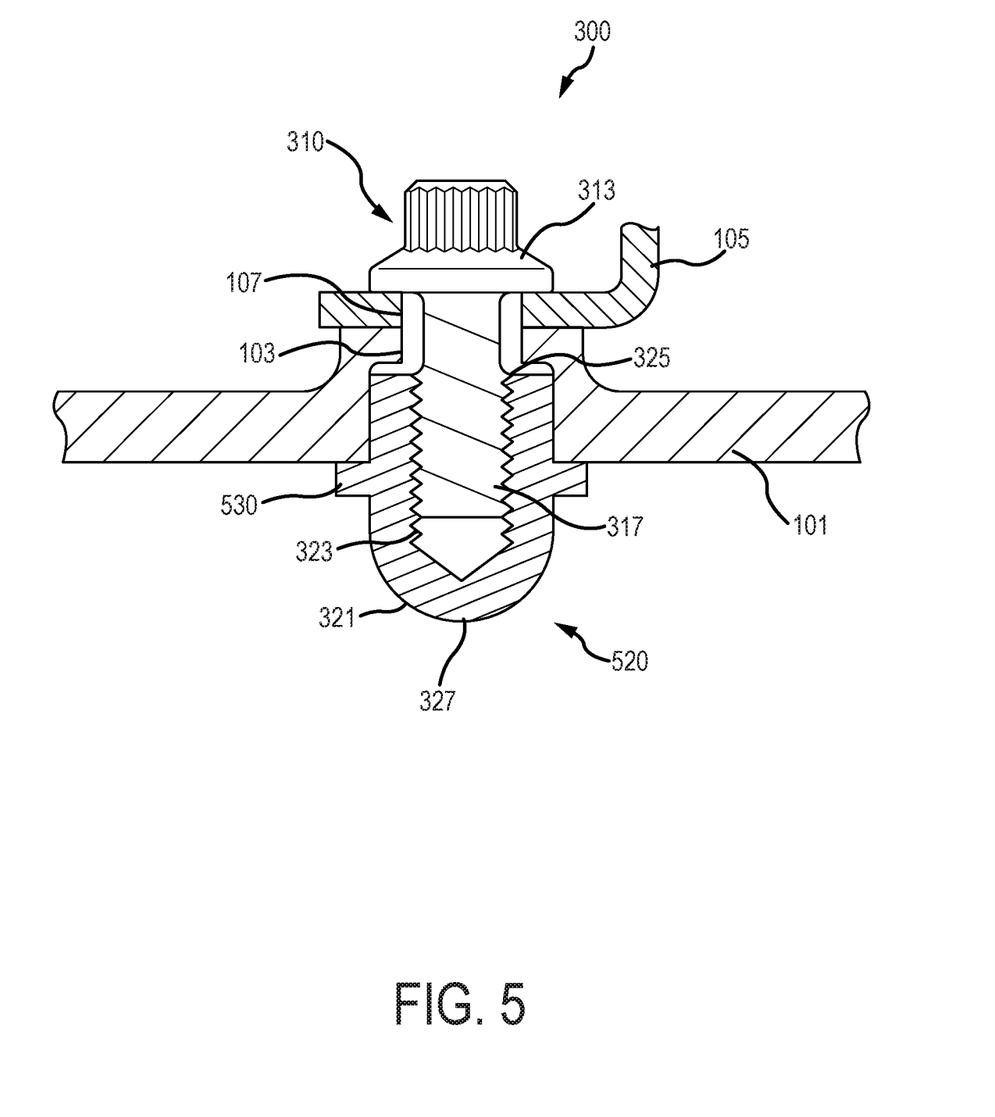
FIG. 5 illustrates a cross-sectional view of a fastener assembly comprising a leak resistant insert having a flange, in accordance with various embodiments.
Figure 6:
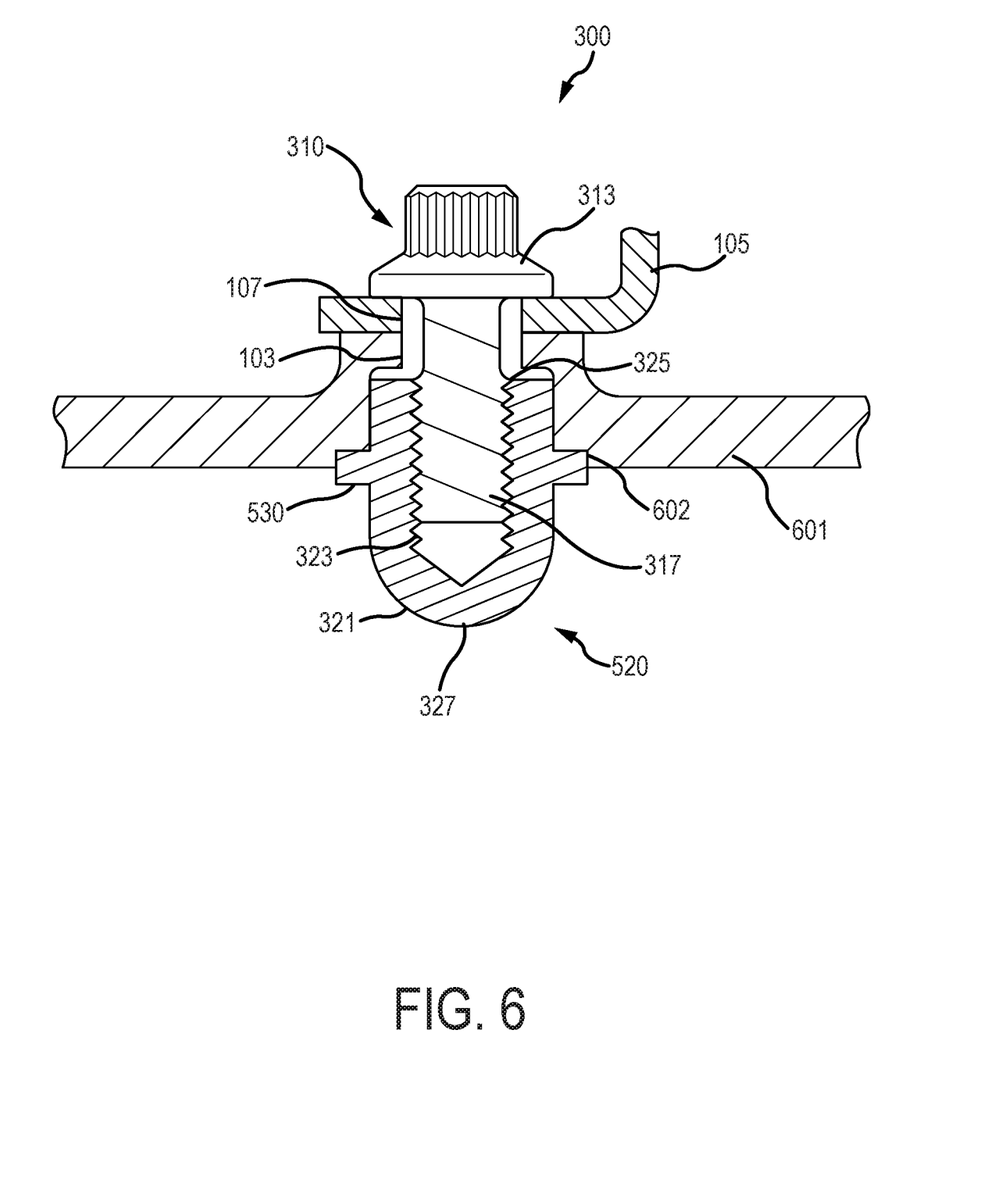
FIG. 6 illustrates a cross-sectional view of a fastener assembly comprising a leak resistant insert having a flange engaged with a case wall recess, in accordance with various embodiments.

In various embodiments, and with reference to FIG. 5, a leak resistant insert 520 may further comprise a flange 530. Leak resistant insert 520 may be similar to leak resistant insert 320, with brief reference to FIG. 3. Flange 530 may define a radial protrusion from outer surface 321. Flange 530 may be located proximate insert opening 325, at a midpoint between insert opening 325 and insert end 327, and/or at any other suitable location on outer surface 321. Flange 530 may comprise any suitable size and shape, and may be configured to contact a surface of case wall 101 in response to leak resistant insert 520 being installed into case wall hole 103. With reference to FIG. 6, and in accordance with various embodiments, flange 530 may be configured to engage a case wall recess 602 in case wall 601. In that regard, in response to leak resistant insert 520 being installed into case wall hole 103, flange 530 may be configured to fit within case wall recess 602 to further the coupling (and fluid seal) of leak resistant insert 520 to case wall 101.

Figure 7:
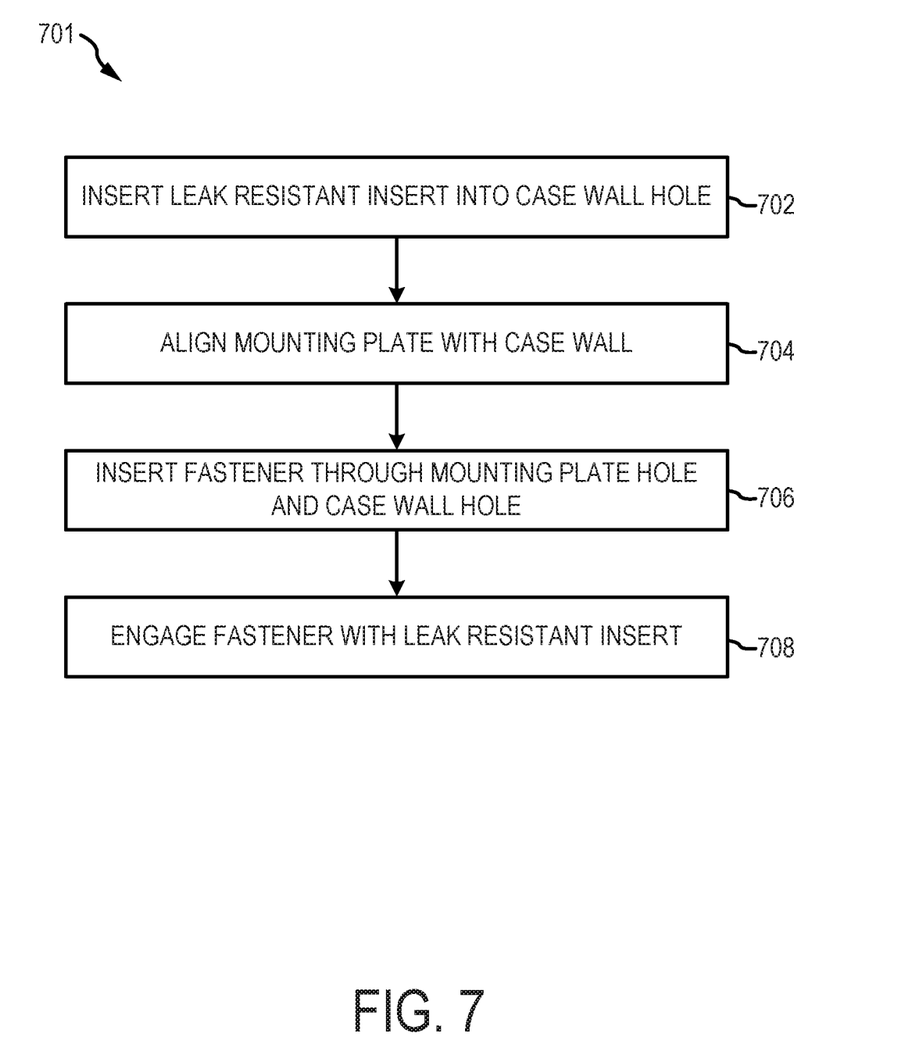
FIG. 7 illustrates a process flow for a method of installing a fastener assembly, in accordance with various embodiments.

In various embodiments, and with combined reference to FIG. 7 and FIG. 3, a method 701 for installing a fastener assembly 300 having a leak resistant insert 320 is disclosed. Method 701 may be used to couple mounting plate 105 to case wall 101 via fastener assembly 300. Method 701 may comprise inserting leak resistant insert 320 into case wall hole 103 (step 702). Leak resistant insert 320 may be inserted into case wall hole 103 using any suitable technique and process. For example, a press fit installation process may be used wherein a lubricant is provided on to at least one of outer surface 321 and/or case wall hole 103, and leak resistant insert 320 is pressed into case wall hole 103 (e.g., using an arbor press or the like). As a further example, a shrink fit installation process may be used wherein leak resistant insert 320 is first cooled to a low temperature using dry ice or liquid nitrogen to allow leak resistant insert 320 to contract in size before installation into case wall hole 103, and expand in size post-installation.

In various embodiments, method 701 may comprise aligning mounting plate 105 with case wall 101 (step 704). For example, mounting plate 105 may be placed onto case wall 101, and mounting plate hole 107 may be aligned with case wall hole 103. Method 701 may comprise inserting fastener 310 through mounting plate hole 107 and case wall hole 103 (step 704). Method 701 may comprise engaging fastener 310 with leak resistant insert 320 (step 706). Fastener 310 may be inserted into leak resistant insert 320 and rotated or tightened to engage the threading on threaded body 317 with the threading on inner threaded surface 323. In that regard, in response to engaging fastener 310 with leak resistant insert 320, fastener assembly 300 may couple mounting plate 105 to case wall 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to be interpreted as a means-plus-function element unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A leak resistant fastener insert, comprising:
an outer surface;
an inner threaded surface opposite the outer surface;

a first surface extending from the outer surface to the inner threaded surface, wherein the first surface defines an insert opening configured to receive a fastener, and wherein the outer surface defines an insert end enclosing the inner threaded surface, the insert end being opposite the insert opening; and a flange extending from the outer surface, wherein the flange is located at a midpoint between the insert opening and the insert end, and wherein the flange is configured to form a fluid seal extending continuously 360° about the outer surface, and wherein a diameter of the outer surface proximate the first surface is equal to a diameter of the outer surface proximate the flange, and wherein the outer surface extends uninterrupted between the flange and the insert end.

2. The leak resistant fastener insert of claim 1, wherein the insert end comprises at least one of a conical shape, an elliptical shape, a parabolic shape, a stepped shape, a concave shape, or a hemispherical shape.

3. The leak resistant fastener insert of claim 1, wherein the insert end comprises a square shape.

4. The leak resistant fastener insert of claim 1, wherein the leak resistant fastener insert comprises a nickel-chromium alloy material, a titanium alloy material, a cobalt alloy material, or a corrosion resistant steel material.

5. The leak resistant fastener insert of claim 1, wherein the leak resistant fastener insert is monolithic.

6. A fastener assembly, comprising:
a leak resistant insert, comprising:
an outer surface;
an inner threaded surface opposite the outer surface;
a first surface extending from the outer surface to the inner threaded surface, wherein the first surface defines an insert opening, and wherein the outer surface defines an insert end enclosing the inner threaded surface, the insert end being opposite the insert opening; and
a flange extending from the outer surface, wherein the flange is configured to form a fluid seal extending continuously 360° about the outer surface, and wherein a diameter of the outer surface is consistent between the flange and the first surface, and wherein the outer surface extends uninterrupted between the flange and the insert end; and
a fastener inserted within the insert opening and coupled to the inner threaded surface of the leak resistant insert.

7. The fastener assembly of claim 6, wherein the fastener comprises a threaded body configured to engage the inner threaded surface of the leak resistant insert in response to the fastener being coupled to the leak resistant insert.

8. The fastener assembly of claim 6, wherein the flange is located at a midpoint between the insert opening and the insert end.

9. The fastener assembly of claim 6, wherein the insert end of the leak resistant insert comprises at least one of a conical shape, an elliptical shape, a parabolic shape, a stepped shape, a concave shape, or a hemispherical shape.

10. The fastener assembly of claim 6, wherein the insert end of the leak resistant insert comprises a square shape.

11. The fastener assembly of claim 6, wherein the leak resistant insert comprises a nickel-chromium alloy material, a titanium alloy material, a cobalt alloy material, or a corrosion resistant steel material.

12. The fastener assembly of claim 6, wherein the leak resistant insert is monolithic.

13. A gas turbine engine, comprising:
a compressor section;
a combustor section; and
a turbine section,
wherein at least one of the compressor section, the combustor section, or the turbine section has a fastener assembly mounting a case wall of the at least one of the compressor section, the combustor section, or the turbine section to a mounting plate of the at least one of the compressor section, the combustor section, or the turbine section, the fastener assembly comprising:
a leak resistant insert located in the first structure, the leak resistant insert comprising:
an outer surface contacting the case wall;
an inner threaded surface opposite the outer surface;
a first surface extending from the outer surface to the inner threaded surface, wherein the first surface defines an insert opening, and wherein the outer surface defines an insert end enclosing the inner threaded surface, the insert end being opposite the insert opening, and wherein the first surface and the insert opening are located in the case wall; and
a flange extending from the outer surface and contacting the case wall, wherein the flange extends continuously 360° about the outer surface and forms a fluid seal with the case wall, and wherein the outer surface extends uninterrupted between the flange and the insert end; and
a fastener located through an opening in the mounting plate, wherein the mounting plate is located between the case wall and a head of the fastener, and wherein the fastener is inserted within the insert opening and is coupled to the inner threaded surface of the leak resistant insert.

14. The gas turbine engine of claim 13, wherein the leak resistant insert is press fit within the case wall of the at least one of the compressor section, the combustor section, or the turbine section.

15. The gas turbine engine of claim 13, wherein the fastener comprises a threaded body configured to engage the inner threaded surface of the leak resistant insert in response to the fastener being coupled to the leak resistant insert.

16. The gas turbine engine of claim 13, wherein the flange is located at a midpoint between the insert opening and the insert end.

17. The gas turbine engine of claim 13, wherein the insert end of the leak resistant insert comprises at least one of a conical shape, an elliptical shape, a parabolic shape, a stepped shape, a concave shape, or a hemispherical shape.

18. The gas turbine engine of claim 13, wherein the insert end of the leak resistant insert comprises a square shape.

19. The gas turbine engine of claim 13, wherein the leak resistant insert is monolithic.

20. The gas turbine engine of claim 13, wherein the mounting plate comprises at one of a bracket, a combustor panel, a combustor shell, a fuel nozzle, or an igniter.

* * * * *